(12) United States Patent
Bulgrien (10) Patent No.: US 10,451,124 B2
(45) Date of Patent: Oct. 22, 2019

(54) CLUTCH CONTROL SYSTEM FOR A WORK VEHICLE

(71) Applicant: CNH Industrial America LLC, New Holland, PA (US)

(72) Inventor: Garth Harvey Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 430 days.

(21) Appl. No.: 15/426,748

(22) Filed: Feb. 7, 2017

(65) Prior Publication Data

US 2018/0223918 A1 Aug. 9, 2018

(51) Int. Cl.
*F16D 48/06* (2006.01)
*F16H 61/684* (2006.01)
*F16H 59/14* (2006.01)

(52) U.S. Cl.
CPC ........... *F16D 48/06* (2013.01); *F16H 61/684* (2013.01); *B60Y 2200/221* (2013.01); *F16D 2500/10412* (2013.01); *F16D 2500/1107* (2013.01); *F16D 2500/30412* (2013.01); *F16D 2500/30421* (2013.01); *F16D 2500/30806* (2013.01); *F16D 2500/31413* (2013.01); *F16D 2500/50287* (2013.01); *F16D 2500/70252* (2013.01); *F16H 2059/147* (2013.01); *F16H 2312/022* (2013.01); *F16H 2312/10* (2013.01)

(58) Field of Classification Search
None
See application file for complete search history.

(56) References Cited

U.S. PATENT DOCUMENTS

| | | | |
|---|---|---|---|
| 5,083,647 A | 1/1992 | Bulgrien | |
| 5,101,943 A | 4/1992 | Bulgrien | |
| 5,251,132 A | 10/1993 | Bulgrien | |
| 5,475,561 A | 12/1995 | Goeckner et al. | |
| 5,509,520 A | 4/1996 | Evans et al. | |
| 5,613,581 A | 3/1997 | Fonkalsrud et al. | |
| 5,778,329 A | 7/1998 | Officer et al. | |
| 6,162,146 A | 12/2000 | Hoefling | |
| 6,471,022 B1 | 10/2002 | Goebel et al. | |
| 6,647,332 B1 | 11/2003 | Esterby et al. | |
| 6,676,562 B1 | 1/2004 | Bulgrien | |
| 6,736,746 B2 | 5/2004 | Hosotani et al. | |
| 7,344,473 B2 | 3/2008 | Ishibashi et al. | |
| 8,287,433 B2 | 10/2012 | Kishii | |
| 8,353,804 B2 | 1/2013 | Versteyhe et al. | |

(Continued)

*Primary Examiner* — Jacob S. Scott
(74) *Attorney, Agent, or Firm* — Rickard K. DeMille; Rebecca L. Henkel (57) ABSTRACT

A clutch control system for a work vehicle includes a controller having a memory and a processor. The controller is configured to receive a first signal indicative of a clutch pedal position, to determine an output torque based on the clutch pedal position, and to determine an inching torque for a control clutch based on the output torque and a first gear ratio downstream from the control clutch. The controller is also configured to determine an input torque based on the clutch pedal position, and to determine a launch torque for the control clutch based on the input torque and a second gear ratio upstream of the control clutch. The controller is also configured to determine a clutch control torque for the control clutch based on the inching torque and the launch torque, and to output a second signal indicative of the clutch control torque to the control clutch.

20 Claims, 6 Drawing Sheets

(56) References Cited

U.S. PATENT DOCUMENTS

| | | |
|---|---|---|
| 8,651,205 B2 | 2/2014 | Chess et al. |
| 9,002,595 B2 | 4/2015 | Davis et al. |
| 9,114,800 B2 | 8/2015 | Clark et al. |
| 2015/0158492 A1 | 6/2015 | Bulgrien et al. |

CLUTCH CONTROL SYSTEM FOR A WORK VEHICLE

BACKGROUND

The present disclosure relates generally to a clutch control system for a work vehicle.

In certain work vehicles, a clutch pedal or inching pedal is used to control engagement of a clutch for inching (e.g., for moving the work vehicle to connect to an implement) and for launch. Work vehicle transmissions typically have multiple forward gears (e.g., 16, 24, etc.) and the work vehicle may start from rest using various gears (e.g., depending on conditions). Also, an inching clutch may be connected to the transmission input, to the transmission output, or to a shaft between the input and output, such that the ratio from input to the inching clutch and/or the ratio from the inching clutch to the output may vary depending on the selected gear ratio. For inching, it is advantageous to have the same relationship between inching pedal position and transmission output torque regardless of the selected gear. For launch, it is advantageous to have the same relationship between inching pedal position and transmission input torque regardless of the selected gear, to maximize use of available engine torque without stalling or excessive lugging. If a single relationship between clutch pedal position and clutch torque is used for all gear ratios, the behavior of the tractor may be quite different while starting from different gear ratios. This is particularly objectionable if adjacent gears behave very differently. Accordingly, typical transmission controllers include multiple lookup tables for controlling the relationship of pedal position to inching clutch torque, with each table being associated with a respective gear ratio of the transmission. Unfortunately, creating the multiple tables for the respective gear ratios may be time-consuming and expensive.

BRIEF DESCRIPTION

In one embodiment, a clutch control system includes a controller having a memory and a processor. The controller is configured to receive a first signal indicative of a clutch pedal position. Furthermore, the controller is configured to determine an output torque based on the clutch pedal position, and to determine an inching torque for a control clutch based on the output torque and a first gear ratio downstream from the control clutch. Furthermore, the controller is configured to determine an input torque based on the clutch pedal position, and to determine a launch torque for the control clutch based on the input torque and a second gear ratio upstream of the control clutch. The controller is also configured to determine a clutch control torque for the control clutch based on the inching torque and the launch torque, and to output a second signal indicative of the clutch control torque to the control clutch.

In another embodiment, a method for controlling a control clutch of a work vehicle includes receiving a first signal indicative of a clutch pedal position. Furthermore, the method includes determining an output torque based on the clutch pedal position, and determining an inching torque for the control clutch based on the output torque and a first gear ratio downstream from the control clutch. Furthermore, the method includes determining an input torque based on the clutch pedal position, and determining a launch torque for the control clutch based on the input torque and a second gear ratio upstream of the control clutch. The method also includes determining a clutch control torque for the control clutch based on the inching torque and the launch torque, and outputting a second signal indicative of the clutch control torque to the control clutch.

In a further embodiment, an apparatus includes at least one non-transitory, tangible, machine-readable medium having instructions encoded thereon for execution by a processor. The instructions include instructions to receive a first signal indicative of a clutch pedal position and to determine an output torque based on the clutch pedal position. The instructions also include instructions to determine an inching torque for a control clutch based on the output torque and a first gear ratio downstream from the control clutch. The instructions further include instructions to determine an input torque based on the clutch pedal position, and to determine a launch torque for the control clutch based on the input torque and a second gear ratio upstream of the control clutch. The instructions also include instructions to determine a clutch control torque for the control clutch based on the inching torque and the launch torque, and to output a second signal indicative of the clutch control torque to the control clutch.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
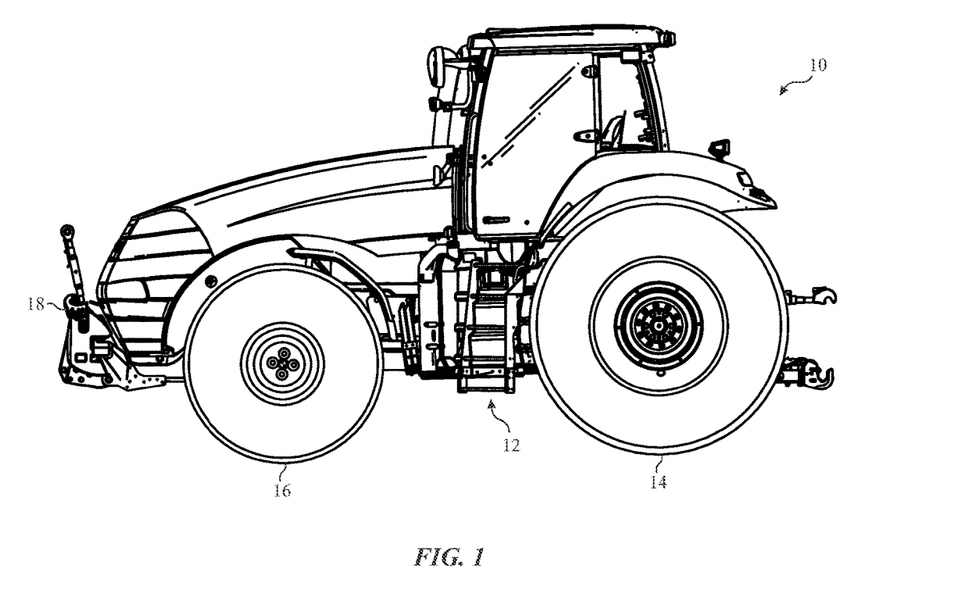
FIG. 1 is a side view of an embodiment of a work vehicle that may include a clutch control system.

Turning now to the drawings, FIG. 1 is a side view of a work vehicle 10 that may include a clutch control system. The work vehicle 10 may be any suitable type of loader, tractor, grader, backhoe, forklift, agricultural vehicle, or any other suitable vehicle that utilizes a transmission. The work vehicle 10 has a body 12 that may house an engine, transmission, and power train. The work vehicle 10 has two rear wheels 14 and two front wheels 16 that rotate to move the work vehicle 10. In some embodiments, the front wheels 16 and/or the rear wheels 14 may be replaced by two or more tracks. The work vehicle 10 drives the front wheels 16, the rear wheels 14, and/or the tracks using a transmission. For example, the work vehicle 10 may use a powershift transmission system to transfer power from the engine to the wheels 16 and 14. The work vehicle may tow any suitable type of implement, such as a seeder, a planter, or an air cart, among others.

Figure 2:
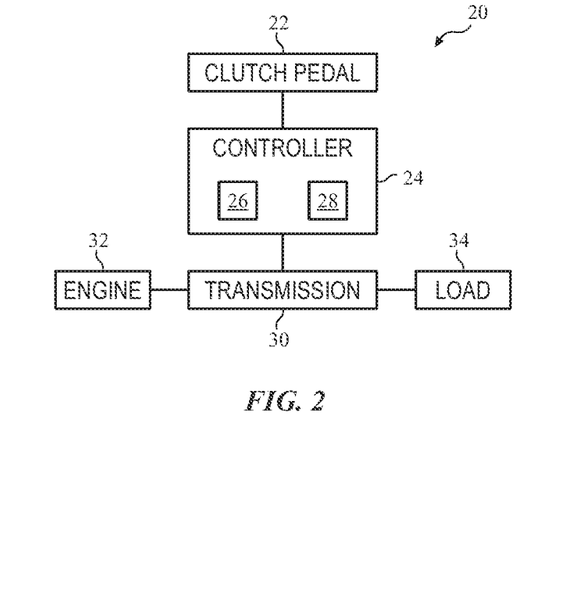
FIG. 2 is a block diagram of an embodiment of a clutch control system that may be employed within the work vehicle of FIG. 1.

FIG. 2 is a block diagram of an embodiment a clutch control system 20 that may be employed within the work vehicle 10 of FIG. 1. The clutch control system 20 includes a clutch pedal 22 that may be depressed a certain amount to achieve a desired clutch pedal position. The clutch pedal (e.g., a sensor of the clutch pedal) outputs a first signal indicative of the clutch pedal position, which is received by a controller 24. The controller 24 includes one or more memory device(s) 26 and one or more processor(s) 28. For example, the memory device(s) 26 may include volatile memory, such as random access memory (RAM), and/or non-volatile memory, such as read-only memory (ROM), optical drives, hard disc drives, solid-state drives, or a combination thereof. Additionally, the one or more processor(s) 28 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, ASICs, and other programmable circuits. The memory device(s) 26 (e.g., non-transitory, computer-readable medium/memory circuitry) may store one or more sets of instructions (e.g., processor-executable instructions) implemented to operate a transmission system 30. Further, the transmission system 30 may be coupled to an engine 32, which may provide power to the transmission system 30, and to a load 34, which may be powered by the engine 32 and transmission system 30. In operation, the controller 24 uses the processor(s) 28 to execute instructions stored in the memory device(s) 26 to control the transmission system 30. For example, the controller 24 may receive instructions to cause various clutches to be engaged/disengaged to cause gear ratio changes in the transmission system 30 while the work vehicle 10 is moving (e.g., at different speeds). The transmission system 30 may include a hydraulic system, clutches, gears, shafts, a planetary gear unit, seals and gaskets, a torque converter, a modulator, and sensor(s), among other components.

Figure 3:
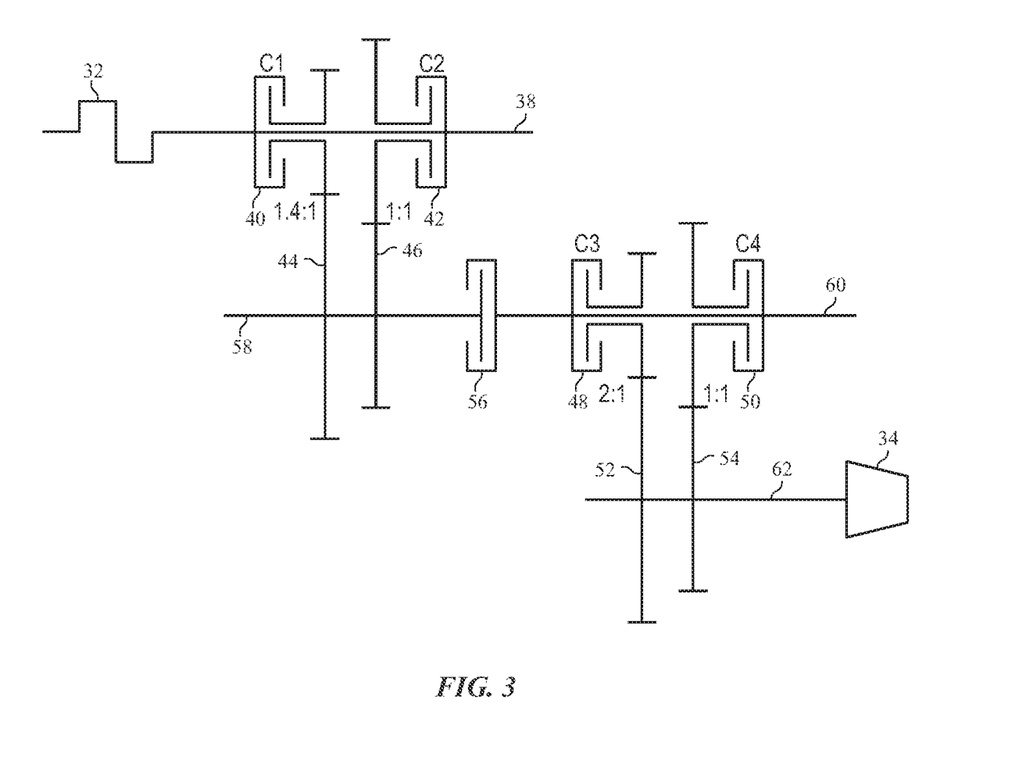
FIG. 3 is a schematic diagram of an embodiment of a transmission system that may be used in the clutch control system of FIG. 2.

FIG. 3 is a schematic diagram of an embodiment of a transmission system 30 that may be used in the clutch control system of FIG. 2. An input shaft 38 of the transmission system 30 is coupled to an input, such as the engine 32. The input shaft 38 is driven by the engine 32. The transmission system 30 also includes a first clutch 40, a second clutch 42, a first gear set 44, and a second gear set 46. The input shaft 38 may be selectively engaged with the first gear set 44 via the first clutch 40, and the input shaft 38 may be selectively engaged with the second gear set 46 via the second clutch 42. The first gear set 44 has a 1.4:1 gear ratio, and the second gear set 46 has a 1:1 gear ratio. In other embodiments, the transmission system 30 may include one, two, three, four, five, six, or more clutches coupled to the input shaft 38 and a corresponding number of gear sets.

The transmission system 30 also includes a first shaft 58, a control clutch 56, a third clutch 48, a third gear set 52, a fourth clutch 50, a fourth gear set 54, and a second shaft 60. Upon engagement of the first or second clutch (40 and 42), power is transferred to the first shaft 58 through the first gear set 44 or the second gear set 46, respectively. The torque applied to the first shaft 58 depends on the value of the gear ratio of the engaged gear set. For example, engaging the first clutch 40 couples the input shaft 38 to the first shaft 58 via the first gear set 44 having a 1.4:1 gear ratio. Accordingly, the torque applied to the first shaft 58 is 1.4 times greater than the torque applied to the input shaft 38. However, engaging the second clutch 42 couples the input shaft 38 to the first shaft 58 via the second gear set 44 having a 1:1 gear ratio. Accordingly, the torque applied to the first shaft 58 is equal to the torque applied to the input shaft 38. The control clutch 56 (e.g., inching clutch) controls engagement of the first shaft 58 with the second shaft 60 to transfer power from the first shaft 58 to the second shaft 60. The torque of the control clutch 56 can be controlled to control the amount of torque transferred to the second shaft 60. The amount of torque that is transferred may depend on the instructions from the controller 24 of FIG. 2.

The second shaft 60 may be selectively engaged with the third gear set 52 via the third clutch 48, and the second shaft 60 may be selectively engaged with the fourth gear set 54 via the fourth clutch 50. The third gear set 52 has a 2:1 gear ratio and the fourth gear set 54 has a 1:1 gear ratio. In other embodiments, the transmission system 30 may include one, two, three, four, five, six, or more clutches coupled to the second shaft 60 and a corresponding number of gear sets. Upon engagement of the third or fourth clutch (48 and 50), power is transferred to the output shaft 62 through the third gear set 52 or the fourth gear set 54, respectively. The torque applied to the output shaft 62 depends on the value of the gear ratio of the engaged gear set. For example, engaging the third clutch 48 couples the second shaft 60 to the output shaft 62 via the third gear set 52 having a 2:1 gear ratio. Accordingly, the torque applied to the output shaft 62 is 2 times greater than the torque applied to the second shaft 60. However, engaging the fourth clutch 50 couples the second shaft 60 to the output shaft 62 via the fourth gear set 54 having a 1:1 gear ratio. Accordingly, the torque applied to the output shaft 62 is equal to the torque applied to the second shaft 60. The output shaft 62 then transfers power to the load 34. Further, any of the clutches in any of the embodiments herein may function as the control clutch 56 (e.g., any of the clutches may function to transfer various amounts of torque depending on the instructions of the controller). For example, in some embodiments, a dedicated control clutch may be omitted. Further, different clutches may function as the control clutch as different gear sets are selectively engaged. For example, the third clutch 48 may be used as the control clutch if the third gear set 52 is selectively engaged, and the fourth clutch 50 may be used as the control clutch if the fourth gear set 54 is selectively engaged.

To control a clutch (e.g., control clutch 56) of the transmission system 30, the controller may control electrical current through a clutch solenoid. The solenoid then controls clutch pressure based on the electrical current. Then, the clutch pressure controls torque through the clutch. In some embodiments discussed herein, gear ratios may be described via a downstream or an upstream direction. For reference, upstream may refer to a total gear ratio from the input shaft 38 to the control clutch 56, and downstream may refer to a total gear ratio from control clutch 56 to the output shaft 62.

The clutches described herein may be any suitable type(s), including dry clutch(es), wet clutch(es), single/multi-plate clutch(es), pneumatic and hydraulic clutch(es), electromagnetic clutch, or any combination thereof, among other types of clutches. Furthermore, each of the clutches may be configured to selectively couple a gear to a shaft or selectively couple a shaft to another shaft upon receiving a control signal from the controller. The described system of gears and shafts can be actuated with the five clutches (first, second, control, third, and fourth) to achieve different gear ratios (e.g., speeds) between the input shaft 38 and the output shaft 62. For example, the clutches may be controlled (i.e., via the controller) to control the engagement/disengagement of each clutch with its respective gear(s) and/or shaft(s) to transfer power along different power flow paths to achieve different speeds. Furthermore, there may be one, two, three, four, five, six, or more shafts in addition to the ones already described with reference to FIG. 3. These additional shafts may also each have one, two, three, four, five, six, or more clutches and corresponding gear sets.

Figure 4:
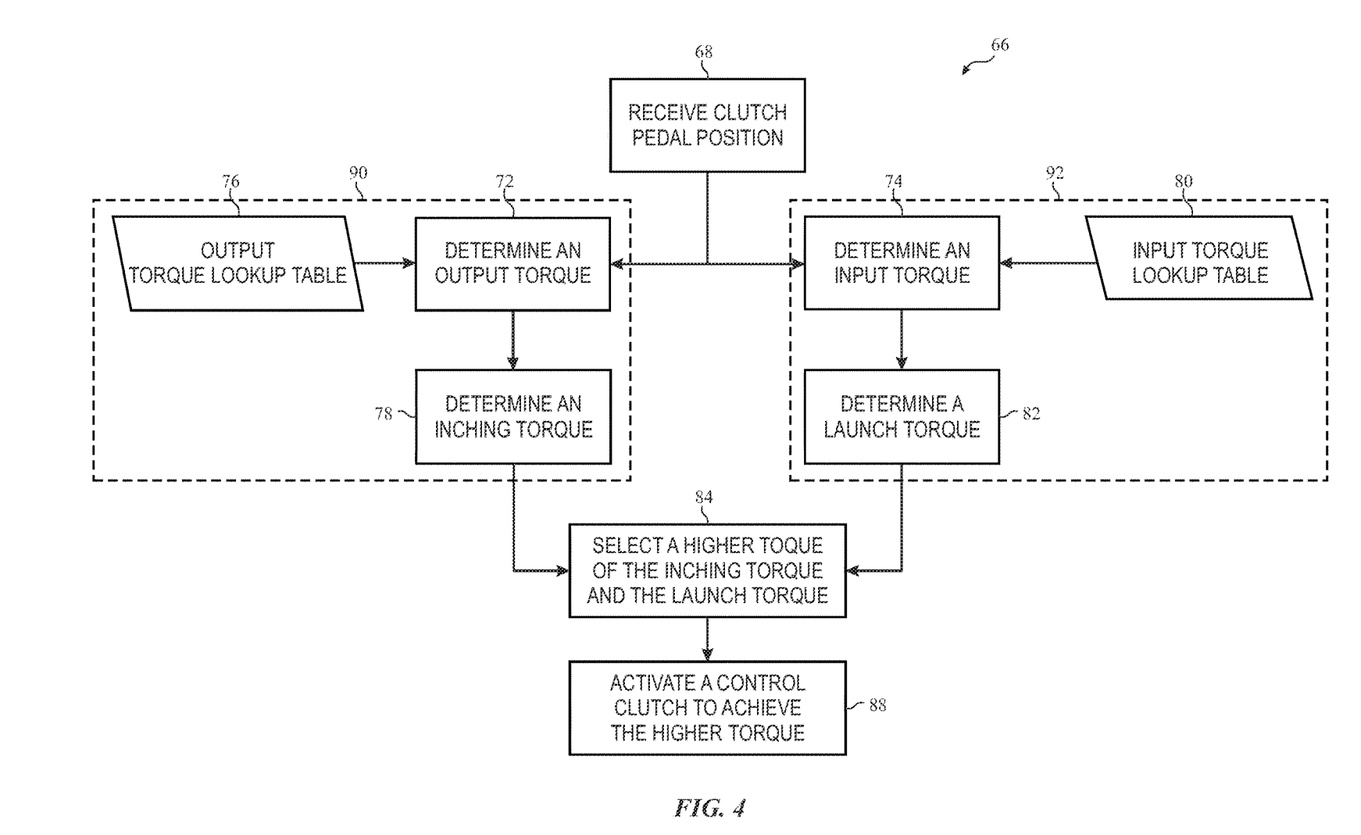
FIG. 4 is a flow chart of an embodiment of a method for controlling a control clutch.

FIG. 4 is a flow chart 66 of an embodiment of a method for controlling the control clutch 56. An operator of the work vehicle 10 may depress a clutch pedal 22, which in turn outputs a signal indicative of clutch pedal position. The clutch pedal position may be represented in terms of a percentage from zero to 100 percent. At block 68, the signal indicative of clutch pedal position is received (e.g., received by the controller 24). At block 72, an output torque is determined based on the clutch pedal position and a relationship between clutch pedal position and output torque, such as an inching lookup table 76. Alternatively, the relationship may be expressed as an equation, a chart, a graph, or any other suitable representation of the relationship between the clutch pedal position and the output torque for inching. At block 78, an inching torque is determined by dividing the output torque by the gear ratio from the control clutch 56 to the output shaft (e.g., the gear ratio downstream from the control clutch). At block 74, an input torque is determined based on the clutch pedal position and a relationship between clutch pedal position and input torque, such as a launch lookup table 80. Alternatively, the relationship may be expressed as an equation, a chart, a graph, or any other suitable representation of the relationship between pedal position and the input torque for launch. At block 82, a launch torque is determined by multiplying the input torque by the gear ratio from the control clutch 56 to the input shaft (e.g., the gear ratio upstream from the control clutch). At block 84, the inching torque and the launch torque are compared. The higher value of the inching torque and the launch torque is selected as a control clutch torque. The control clutch torque is then output as a second signal to block 88 where the control clutch 56 is activated. Furthermore, section 90, which contains blocks 76, 72, and 78, and section 92, which contains blocks 74, 80, and 82 may be performed concurrently or at different times during the process described in the flow chart 66.

Multiplying by gear ratios facilitates the use of only two tables. Using only two tables is less costly and time-consuming to create than, for example, 24 tables for 24 forward gears. Furthermore, using only two lookup tables may result in few to no errors when tuning the tables. Using only two tables during this process also results in a small amount of memory 28 within the controller 24 being used.

Figure 5:
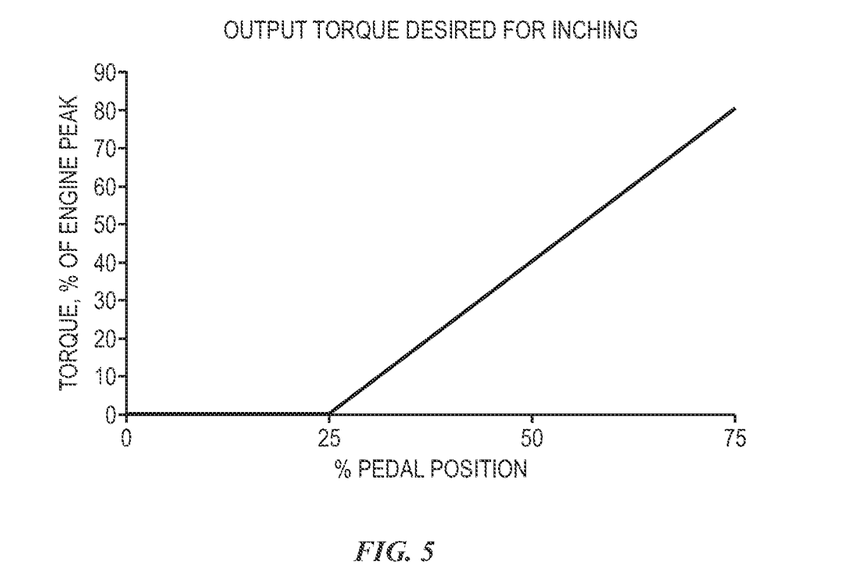
FIG. 5 is a graph of an embodiment of a relationship between clutch pedal position and output torque.

FIG. 5 is a graph of an embodiment of a relationship between clutch pedal position and output torque. In the illustrated embodiment, pedal position is represented as a percentage with zero representing fully depressed. In other embodiments, pedal position may be represented as a length, position, etc. In the illustrated embodiment, the output torque is represented as a percentage of peak engine torque. However, in other embodiments, the torque may be represented as a measure of newton-meters, foot pound torque, etc. In the illustrated embodiment, the relationship between the output torque and the pedal position is linear. However, in other embodiments, the relationship may be non-linear (e.g., the curve may become steeper as the pedal position increases). Furthermore, in other embodiments the relationship between pedal position and output torque may be represented in tabular form, mathematical form, etc.

Figure 6:
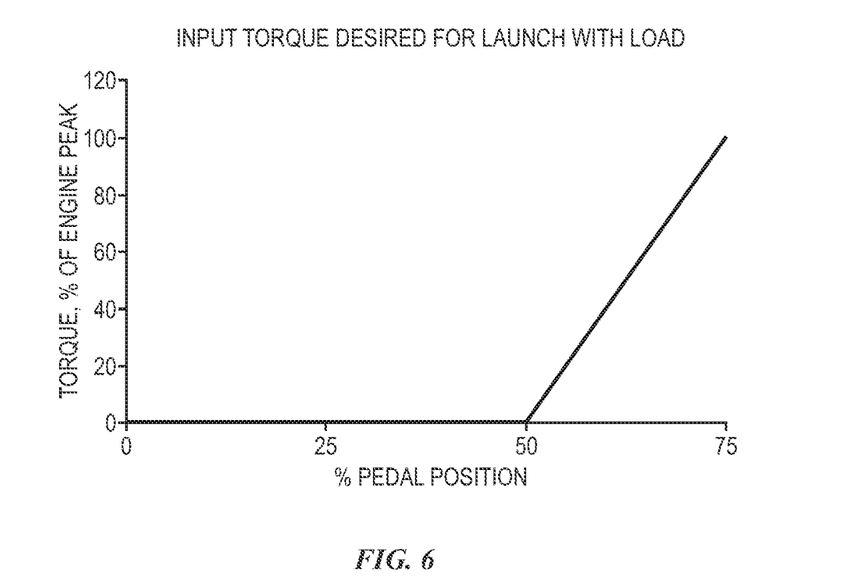
FIG. 6 is a graph of an embodiment of a relationship between clutch pedal position and input torque.

FIG. 6 is a graph of an embodiment of a relationship between clutch pedal position and input torque. In the illustrated embodiment, pedal position is represented as a percentage with zero representing fully depressed. In other embodiments, pedal position may be represented as a length, position, etc. In the illustrated embodiment, the input torque is represented as a percentage of peak engine torque. However, in other embodiments, the torque may be represented as a measure of newton-meters, foot pound torque, etc. In the illustrated embodiment, the relationship between the input torque and the pedal position is linear. However, in other embodiments, the relationship may be non-linear (e.g., the curve may become steeper as the pedal position increases). Furthermore, in other embodiments the relationship between pedal position and input torque may be represented in tabular form, mathematical form, etc.

Figure 7:
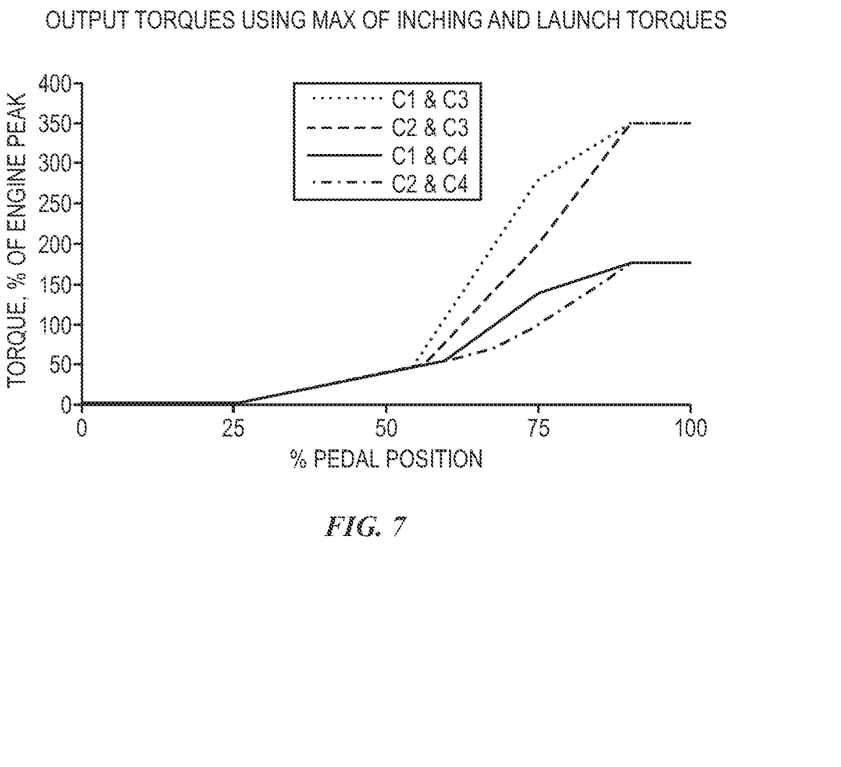
FIG. 7 is a graph of an embodiment of an output torque on a load.
Figure 8:
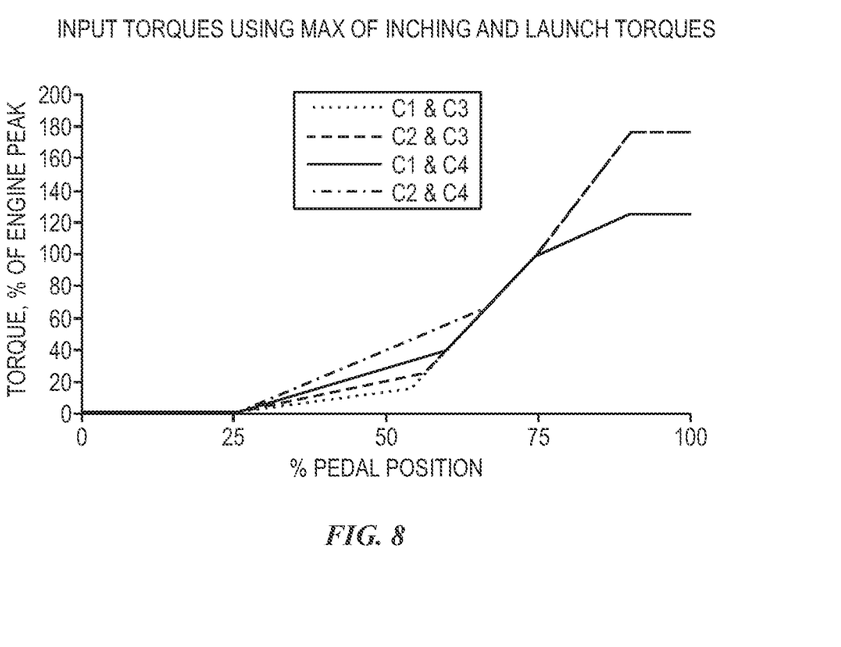
FIG. 8 is a graph of an embodiment of an input torque on a motor.
Figure 9:
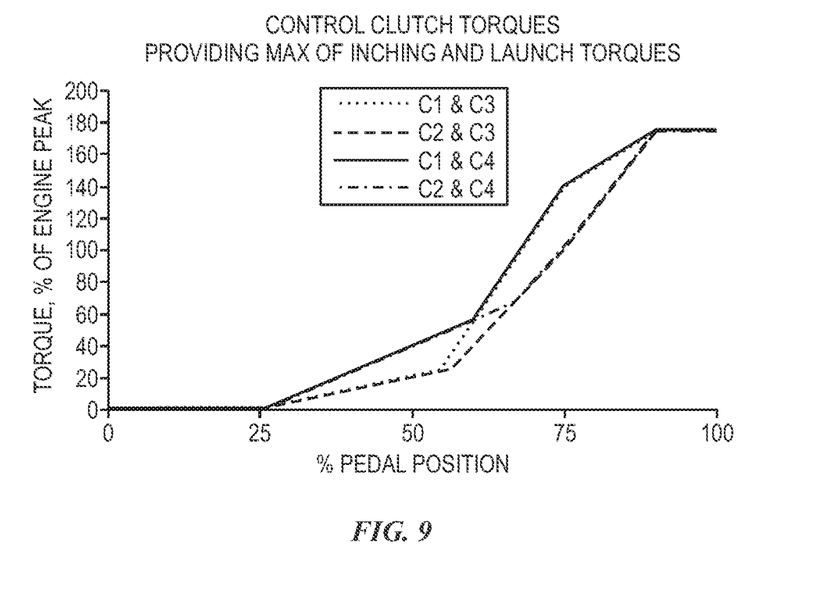
FIG. 9 is a graph of an embodiment of control clutch torque.

In FIGS. 7-9, a torque (e.g., output torque, input torque, control clutch torque) is displayed with respect to the transmission system 30 in FIG. 3 with various gear combinations engaged. For example, "C1 & C3" is when the first clutch 40 and the third clutch 48 is engaged, "C2 & C3" is when the second clutch 42 and the third clutch 48 is engaged, "C1 & C4" is when the first clutch 40 and the fourth clutch 50 is engaged, and "C2 & C4" is when the second clutch 42 and the fourth clutch 50 is engaged. Further, when the various gear combinations are engaged, the associated gear ratio influences the amount of torque transferred. For example, when the first clutch 40 and the third clutch 48 is engaged, the input torque may be low while the output torque may be high. Conversely, when the second clutch 42 and the fourth clutch 50 is engaged, the input torque may be high while the output torque is low. The torques represented in FIGS. 7-9 generally rise from 25 percent to 75 percent as clutch pedal position increases, and are based at least on values in FIGS. 5 and 6. The torques continue to rise as the clutch pedal position increases from 75 percent to 100 percent. However, the 75 percent to 100 percent region of the clutch pedal position is not based on values shown in FIGS. 5 and 6. The torques at 75 percent pedal position are sufficient to employ the peak torque of the engine. At higher clutch pedal positions, the torques increase until a maximum torque capacity of the control clutch is reached. It should be recognized that the maximum torque capacity values are only reached if the control clutch is slipping and is therefore controlling the torque. If the control clutch is locked up, the actual torques are instead controlled by the load and may be lower.

FIG. 7 is a graph of an embodiment of an output torque that may be experienced by the load and the output shaft. During the inching range (e.g., between 25 percent and 50 percent pedal position) the output torque for the gear ratios are substantially equal. Consistent output torques for each gear ratio may be desirable during inching so that the work vehicle moves consistently with pedal position. During the launch range (e.g., between 50 percent and 75 percent), however, the output torques for the different gear ratios vary to transfer more or less torque to the load 64 which, in some embodiments may be the front wheels and/or the back wheels.

FIG. 8 is a graph of an embodiment of an input torque that may be experienced by the input shaft 38 and the motor 36. During the inching range (e.g., between 25 percent and 50 percent pedal position), the input torques for each gear ratios vary. For example, at 25 percent, 0 percent torque of engine peak is observed and at 50 percent, the highest percent of engine peak observed is 40 percent torque. A maximum of 40 percent torque during inching is usually not enough to stall the engine. However, as can be seen in the launch range (i.e., between 50 percent and 75 percent), the input torque values for the different gear ratios converge to provide substantially equal percent of engine peak so as not to stall the engine when using different gear combinations.

FIG. 9 is a graph of an embodiment of the control clutch torque experienced by the control clutch. As previously discussed, the clutch control system selects the higher value of the inching and launch torques and outputs a signal indicative of the higher torque (e.g., control clutch torques to the control clutch). With the current method, each data set (e.g., gear combination) does not have to be individually tuned to provide the same output torque to the load during inching among different gear combinations, which may be required by previous methods. Further, each data set does not have to be individually tuned to provide similar input torque during launch among different gear combinations.

The relationships and tables discussed herein are embodiments of the method and system that may be utilized in the current embodiments of work vehicle and the transmission system. However, in some embodiments, the relationships and tables may change accordingly to the different configurations and embodiments of the work vehicle and the transmission system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A clutch control system for a work vehicle, comprising: a controller comprising a memory and a processor, wherein the controller is configured to receive a first signal indicative of a clutch pedal position, to determine an output torque based on the clutch pedal position, to determine an inching torque for a control clutch based on the output torque and a first gear ratio downstream from the control clutch, to determine an input torque based on the clutch pedal position, to determine a launch torque for the control clutch based on the input torque and a second gear ratio upstream of the control clutch, to determine a clutch control torque for the control clutch based on the inching torque and the launch torque, and to output a second signal indicative of the clutch control torque to the control clutch.

2. The clutch control system of claim 1, wherein the controller is configured to determine the output torque based on a lookup table and the clutch pedal position.

3. The clutch control system of claim 1, wherein the controller is configured to determine the input torque based on a lookup table and the clutch pedal position.

4. The clutch control system of claim 1, wherein the controller is configured to determine the inching torque by dividing the output torque by the first gear ratio.

5. The clutch control system of claim 1, wherein the controller is configured to determine the launch torque by multiplying the input torque by the second gear ratio.

6. The clutch control system of claim 1, wherein determining the clutch control torque comprises selecting the higher value of the inching torque and the launch torque.

7. The clutch control system of claim 1, wherein the controller is configured to determine the output torque based on an inching lookup table and the clutch pedal position, and to determine the input torque based on a launch lookup table and the clutch pedal position.

8. The clutch control system of claim 1, wherein the control clutch is a dedicated inching and/or launch clutch that is not associated with a gear pair.

9. The clutch control system of claim 1, wherein the controller is configured to determine the output torque based on an inching relationship and the clutch pedal position, and to determine the input torque based on a launch relationship and the clutch pedal position.

10. A method for controlling a control clutch of a work vehicle, comprising:
receiving a first signal indicative of a clutch pedal position;
determining an output torque based on the clutch pedal position;
determining an inching torque for the control clutch based on the output torque and a first gear ratio downstream from the control clutch;
determining an input torque based on the clutch pedal position;
determining a launch torque for the control clutch based on the input torque and a second gear ratio upstream of the control clutch;
determining a clutch control torque for the control clutch based on the inching torque and the launch torque; and
outputting a second signal indicative of the clutch control torque to the control clutch.

11. The method of claim 10, wherein determining the output torque comprises using a lookup table to determine the output torque based on the clutch pedal position.

12. The method of claim 10, wherein determining the input torque comprises using a lookup table to determine the input torque based on the clutch pedal position.

13. The method of claim 10, wherein determining the inching torque comprises dividing the output torque by the first gear ratio.

14. The method of claim 10, wherein determining the launch torque comprises multiplying the input torque by the second gear ratio.

15. The method of claim 10, wherein determining the clutch control torque comprises of selecting the higher value of the inching torque and the launch torque.

16. The method of claim 10, wherein determining the output torque comprises determining the output torque based on an inching relationship and the clutch pedal position; and
determining the input torque comprises determining the output torque based on a launch relationship and the clutch pedal position.

17. An apparatus comprising at least one non-transitory, tangible, machine-readable medium having instructions encoded thereon for execution by a processor, the instructions comprising:
instructions to receive a first signal indicative of a clutch pedal position;
instructions to determine an output torque based on the clutch pedal position;
instructions to determine an inching torque for a control clutch based on the output torque and a first gear ratio downstream from the control clutch;
instructions to determine an input torque based on the clutch pedal position;
instructions to determine a launch torque for the control clutch based on the input torque and a second gear ratio upstream of the control clutch;

instructions to determine a clutch control torque for the control clutch based on the inching torque and the launch torque; and instructions to output a second signal indicative of the clutch control torque to the control clutch.

18. The apparatus of claim 17, wherein the instructions to determine the output torque comprise instructions to use an inching lookup table to determine the output torque based on the clutch pedal position; and the instructions to determine the input torque comprise instructions to use a launch lookup table to determine the input torque based on the clutch pedal position.

19. The apparatus of claim 17, wherein the instructions to determine the inching torque comprises instructions to divide the output torque by the first gear ratio; and the instructions to determine the launch torque comprises instructions to multiply the input torque by the second gear ratio.

20. The apparatus of claim 17, wherein the instructions to determine the output torque comprise instructions to determine the output torque based on an inching relationship and the clutch pedal position; and the instructions to determine input torque comprise instructions to determine the input torque based on a launch relationship and the clutch pedal position.

* * * * *